United States Patent
Knoedgen et al.

(10) Patent No.: US 7,403,229 B2
(45) Date of Patent: Jul. 22, 2008

(54) TESTING OF MINIATURIZED DIGITAL CAMERA MODULES WITH ELECTRICAL AND/OR OPTICAL ZOOM FUNCTIONS

(75) Inventors: Horst Knoedgen, Munich (DE); Dirk Huettmann, Baltmannsweiler (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 698 days.

(21) Appl. No.: 10/929,653

(22) Filed: Aug. 30, 2004

(65) Prior Publication Data
US 2006/0038910 A1  Feb. 23, 2006

(30) Foreign Application Priority Data
Aug. 17, 2004 (EP) .................. 04368059

(51) Int. Cl.
G03B 13/00 (2006.01)
H04N 5/232 (2006.01)
H04N 17/00 (2006.01)
H04N 17/02 (2006.01)

(52) U.S. Cl. .................. 348/347; 348/187; 348/357; 348/374

(58) Field of Classification Search ................ 348/187, 348/188; 356/123, 124, 127; 250/201.1; 708/4
See application file for complete search history.

(56) References Cited

U.S. PATENT DOCUMENTS

| 3,447,874 A | 6/1969 | Back | 356/124 |
|---|---|---|---|
| 4,298,944 A | 11/1981 | Stoub et al. | 364/515 |
| 4,612,666 A | 9/1986 | King | 382/32 |
| 4,620,790 A | 11/1986 | Hufnagel | 356/124 |
| 5,179,437 A | 1/1993 | Kawada et al. | 358/10 |
| 5,257,092 A * | 10/1993 | Noguchi et al. | 356/367 |

(Continued)

FOREIGN PATENT DOCUMENTS

DE  3417016 C1  5/1984

(Continued)

OTHER PUBLICATIONS

Harold M. Merklinger: "The In's and Out's of Focus," Aug. 1, 1990, Canada, XP002316955, ISBN: 0-9695025-0-8, Internet Edition, http://www.trenholm.org/hmmerk/download.html, published by the author.

(Continued)

Primary Examiner—Ngoc-Yen Vu
Assistant Examiner—Christopher K Peterson
(74) Attorney, Agent, or Firm—Saile Ackerman LLC; Stephen B. Ackerman

(57) ABSTRACT

A test apparatus and method for testing the zoom of a miniature digital camera module is presented. A combination of focus targets are illuminated by different colors of light and simultaneously viewed by the digital camera module. The focus targets range from a far target to a close target and are positioned in the apparatus accordingly. The zoom capability of the camera can be either electrical or manual, and the test apparatus can be adapted to either zoom configurations allowing the zoom of the camera lens to be controlled by a tester. The brightness of the image of the focus targets captured by the digital camera is monitored to determine whether the focus of the camera is maintained over the range of zoom.

30 Claims, 5 Drawing Sheets

U.S. PATENT DOCUMENTS

| | | | | |
|---|---|---|---|---|
| 5,267,038 | A * | 11/1993 | Fister | 348/191 |
| 5,389,774 | A | 2/1995 | Gelman et al. | 250/201.1 |
| 5,649,258 | A | 7/1997 | Bergstresser et al. | 396/429 |
| 5,880,586 | A | 3/1999 | Dukart et al. | 324/207.2 |
| 5,999,251 | A | 12/1999 | Teramoto et al. | 356/127 |
| 6,041,336 | A | 3/2000 | Steinlechner | 708/4 |
| 6,177,986 | B1 * | 1/2001 | Stockton | 356/124 |
| 6,195,159 | B1 | 2/2001 | MacDonald et al. | 356/123 |
| 6,201,600 | B1 | 3/2001 | Sites et al. | 356/124 |
| 6,219,443 | B1 | 4/2001 | Lawrence | 382/141 |
| 6,512,587 | B1 | 1/2003 | Marcus et al. | 356/497 |
| 7,136,157 | B2 * | 11/2006 | Gomm et al. | 356/237.1 |
| 7,151,560 | B2 * | 12/2006 | Matherson et al. | 348/187 |
| 7,200,497 | B2 * | 4/2007 | Wang et al. | 702/57 |
| 2002/0191973 | A1 | 12/2002 | Hofer et al. | 396/80 |
| 2003/0002749 | A1 | 1/2003 | Vehvilainen | 382/275 |
| 2003/0030648 | A1 | 2/2003 | Baer | 345/589 |
| 2003/0067595 | A1 * | 4/2003 | Alderson et al. | 356/124.5 |
| 2003/0142374 | A1 | 7/2003 | Silverstein | 358/504 |
| 2003/0146976 | A1 | 8/2003 | Liu | 348/207.1 |
| 2003/0214727 | A1 * | 11/2003 | Min et al. | 359/696 |
| 2004/0027456 | A1 | 2/2004 | Pierce | 348/175 |
| 2004/0032496 | A1 | 2/2004 | Ebenstein et al. | 348/187 |
| 2004/0070669 | A1 * | 4/2004 | Aoyama | 348/187 |
| 2005/0162517 | A1 * | 7/2005 | Fujihara et al. | 348/187 |

FOREIGN PATENT DOCUMENTS

| | | |
|---|---|---|
| DE | 19502276 A1 | 1/1995 |
| EP | 0599175 A1 | 6/1994 |
| EP | 0679932 | 11/1995 |
| EP | 819927 A | 1/1998 |
| EP | 1286553 | 2/2003 |
| EP | 1382194 A1 | 1/2004 |
| EP | 1389878 A1 | 2/2004 |
| JP | 03099376 A | 4/1991 |
| JP | 2001292461 | 10/2001 |
| JP | 2002077955 | 3/2002 |
| JP | 2002232918 | 8/2002 |
| JP | 2002290994 | 10/2002 |
| JP | 2003101823 | 4/2003 |
| JP | 2003157425 | 5/2003 |
| JP | 2003179949 | 6/2003 |
| JP | 2003219436 | 7/2003 |
| JP | 2003259126 | 9/2003 |
| WO | WO 02102060 | 12/2002 |

OTHER PUBLICATIONS

Co-pending U.S. Patent App., filed Apr. 16, 2003, U.S. Appl. No. 10/417,317, assigned to the same assignee, "Miniature Camera Module".

Co-pending U.S. Patent App., filed May 8, 2003, U.S. Appl. No. 10/434,743, assigned to the same assignee, "Test System for Camera Modules".

Co-pending U.S. Patent App., filed Aug. 31, 2004, U.S. Appl. No. 10/930,351, to the same assignee.

Co-pending U.S. Patent App., filed Aug. 30, 2004, U.S. Appl. No. 10/929,651, to the same assignee.

Co-pending U.S. Patent App., filed Aug. 31, 2004, U.S. Appl. No. 10/930,353, to the same assignee.

Co-pending U.S. Patent App., filed Aug. 30, 2004, U.S. Appl. No. 10/929,652, to the same assignee.

Co-pending U.S. Patent App., filed Aug. 30, 2004, U.S. Appl. No. 10/929,300, to the same assignee.

* cited by examiner

TESTING OF MINIATURIZED DIGITAL CAMERA MODULES WITH ELECTRICAL AND/OR OPTICAL ZOOM FUNCTIONS

RELATED PATENT APPLICATION

This application is related to U.S. patent application Ser. No. 10/930,351, filed on Aug. 31, 2004, and assigned to the same assignee as the present invention.

This application is related to U.S. patent application Ser. No. 10/929,651, filed on Aug. 30, 2004, and assigned to the same assignee as the present invention.

This application is related to U.S. patent application Ser. No. 10/930,353, filed on Aug. 31, 2004, and assigned to the same assignee as the present invention.

This application is related to U.S. patent application Ser. No. 10/929,652, filed on Aug. 30, 2004, and assigned to the same assignee as the present invention.

This application is related to U.S. patent application Ser. No. 10/929,300, filed on Aug. 30, 2004, and assigned to the same assignee as the present invention.

BACKGROUND OF THE INVENTION

1. Field of Invention

The present invention relates to the testing of miniature digital camera modules and in particular to digital camera modules with electrical and/or optical zoom capability.

2. Description of Related Art

The digital camera is becoming a ubiquitous device. Not only are digital cameras replacing the traditional film camera, digital camera devices are being used in many other applications, such as small electronic devices, such as PDA (personal data assistant) and cellular phones. With the explosion of cellular phones, the ability to take a picture and then send that picture to another individual using a second cellular phone comes the need to produce inexpensive digital camera modules and efficiently test these modules in large quantities. This is further complicated by the many different module configurations that are emerging as a result of the many different application requirements, including fixed focus, manual focus and automatic focus as well as physical size. Some of these modules are very small and others have signal leads in the form of a flex filmstrip. The testing time for digital camera module, which can have mega-pixel capability, has traditionally been a relatively long process (approximately sixty seconds for a module with 0.3 mega pixels) to insure the integrity and picture quality of the camera. Quality testing at a low cost has become the utmost of importance. This necessitates a testing capability that is fast and insures the integrity and specification of the digital camera module while testing a large quantity of modules.

A patent application, Ser. No. 10/417,317 dated Apr. 16, 2003, is related to miniature cameras and their manufacturing methods that are used as built-in modules in hand held consumer electronics devices such as mobile phones and PDA's. In a second patent application, Ser. No. 10/434,743 dated May 8, 2003, a test system is described for digital camera modules used as built-in modules for consumer electronics, which performs electrical tests, adjustment of focus and sealing of the lens barrel with glue.

In addition there are a number of other prior art patents that are directed to testing of digital cameras: US 20040032496A1 (Eberstein et al.) is directed to a method of camera calibration and quality testing; EP 1389878A1 (Bednarz et al.) is directed to a method of camera calibration and testing camera quality; US 20040027456A1 (Pierce) directed to the use of calibration targets; EP 1382194A1 (Baer) is directed to dark current subtraction; JP 2003259126 (Keisuke) is directed to removing noise of an image; US 20030146976A1 (Liu) is directed to a digital camera system enabling remote monitoring; JP 2003219436 (Fuminori) is directed to adjustment of a pixel shift camera; US 2003142374 (Silverstein) is directed to calibrating output of an image output device; JP 2003179949 (Hidetoshi) is directed to a luminance level inspection apparatus; JP 2003157425 (Vehvilainen) is directed to improving image quality produced in a mobile imaging phone; JP 2003101823 (Kenichi) is directed to specifying a picture data area; EP 1286553 A2 (Baer) is directed to a method and apparatus for improving image quality; US 20030030648 (Baer) is directed to a method and apparatus for improving image quality in digital cameras; U.S. Pat. No. 6,512,587 (Marcus et al.) is directed to measurement method and apparatus of an imager assembly; US 20030002749 (Vehvilainen) is directed to a method and apparatus for improving image quality; US 20020191973 A1 (Hofer et al.) is directed to a method and apparatus for focus error reduction; WO 2002102060 A1 (Baer) is directed to a method and apparatus for smear in digital images using a frame transfer sensor; JP 2002290994 (Hidetoshi) is directed to a method and apparatus to detect foreign matter on the surface of a lens; JP 200223918 (Yanshinao) is directed to an image inspection device and method for a camera module; JP 2002077955 (Keisuke) is directed to a method and apparatus for evaluating camera characteristics; JP 2001292461 (Keisuke) is directed to a system and method for evaluating a camera; U.S. Pat. No. 6,219,443 B1 (Lawrence) is directed to a method and apparatus for inspecting a display using a low resolution camera; U.S. Pat. No. 6,201,600B1 (Sites et al.) is directed to a method and apparatus for inspection of optically transmissive objects having a lens; U.S. Pat. No. 5,649,258 (Bergstresser et al.) is directed to an apparatus and testing of a camera; EP 0679932 B1 (Kobayashi et al.) is directed to testing an electronically controlled camera; U.S. Pat. No. 5,179,437 Kawada et al.) is directed to an apparatus for color correction of image signals of a color television camera; JP 03099376 (Hiroshi) is directed to the quality of a display screen; U.S. Pat. No. 4,612,666 (King) is directed to a pattern recognition apparatus; and U.S. Pat. No. 4,298,944 Stoub et al.) is directed to a method and apparatus for distortion correction for scintillation cameras.

SUMMARY OF THE INVENTION

It is an objective of the present invention to test a zoom capability for a miniature digital camera module that has an electrical zoom capability.

It is also an objective of the present invention to test a zoom capability for a miniature digital camera module that has a mechanical zoom capability.

It is further an objective of the present invention to position a plurality of focus targets simultaneously at varying distances from a digital camera module to permit a zoom test to evaluate a full range of focus during the zoom test.

It is further another objective of the present invention to combine the plurality of focus targets into a single composite target.

It is still further an objective of the present invention to position the single composite target to provide optical depth for the zoom test.

In the present invention a miniature digital camera module with a zoom capability is tested for the ability of the zoom to maintain far and near focus over the range of the zoom. An optical system, comprising a light source, focus targets, a field lens, and an image magnifier is used to provide an image to a digital camera module under test (MUT) that can be changed to provide a view to the MUT that is optically closer or farther away from the lens of the MUT. The MUT has either an electrical controlled zoom or a mechanical zoom, the adjustment of which is controlled by a tester.

The tester controls the optical system contained within a test station to vary the image viewed by the MUT. A test fixture within the test station positions the MUT under the optics centerline and provides electrical contact between the MUT and the tester. The zoom adjustment of the MUT is varied over a complete zoom range and the image of the focus targets is measured for maintaining focus as the zoom is changed. When a MUT has an electrically controlled zoom, the tester controls the zoom through electrical signals to the MUT. When the MUT has a mechanically adjustable zoom, a zoom stepper mechanism physically contacts the zoom adjustment of the lens of the MUT, and the tester controls a stepper motor to vary the zoom of the MUT.

The focus targets used to test the zoom capability of the MUT form a composite image that is focused onto the lens of the MUT by the field lens. The composite image comprises a far, an intermediate and a close target that have been positioned simultaneously within the optical view of the MUT. The composite image allows the focus test of the zoom using one setup of the optics system and one set of test images captured by the MUT, which reduces the test time that would have been required for individual targets resulting in multiple setup and test.

A single composite target can also be used to provide the composite image to the MUT for testing the zoom capability. The composite target comprises a far, intermediate and close targets constructed within a single focus target. The composite target is held by a target holder within the view of the MUT and is either orthogonal to the axis of the optical system or at an angle less than ninety degrees with respect to the axis to provide a depth of field.

The focus targets comprise light and dark area, where the light areas are holes in the targets that permit light through. The preferred shape of the holes is round; however, other shapes, i.e. oval, rectangular, hexagonal, and octagonal, can be used. A far target uses large holes and a close target uses small holes with the intermediate targets having a hole size that is in between. Monitoring the brightness of the image viewed by the MUT provides the test of the focus of the targets over the zoom range. If the brightness remains within an acceptable predetermined range, the zoom capability of the MUT is tested as good.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
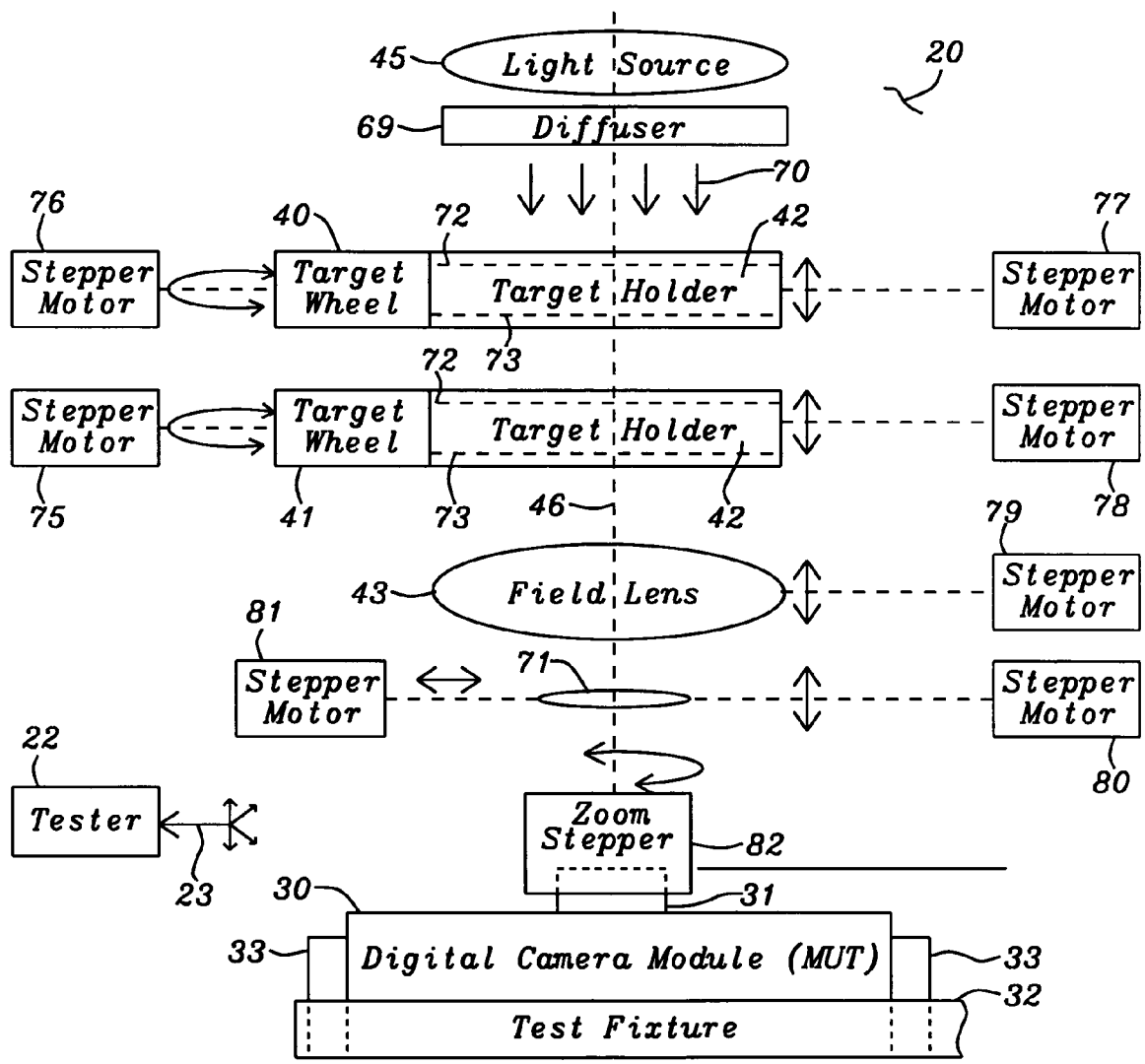
FIG. 1 is a diagram of the optical system of the present invention.

In FIG. 1 a miniature digital camera module under test (MUT) 30 with a lens cap 31, which has an adjustable zoom, is mounted on a test fixture 32 containing positioning clamps 33. When the MUT 30 is place onto the test fixture 32, the MUT is clamped into place by the positioning clamps 33 and contact is made to the electrical I/O of the MUT (not shown). The test fixture 32 positions the MUT 30 under an optical centerline 46 of an optical system 20. A tester 22 provides control data 23 to the optical system 20 and the MUT 30, and receives test data 23 back from the MUT 30.

The optical system contains a light source 45 and a light diffuser 69 to provide illumination 70 to the optical system 39. The light source 45 comprises a plurality of serially connected strings of light emitting diode devices (LED). Each string of LED devices contains LED devices of a same color. There are strings of LED devices that produce colors comprising red, green, blue and infrared. Additional colors are also possible depending upon the test requirements. The tester 22 connected to the optical system controls the selection of a color of light and the intensity of the light. Any source of light that produces the colors required and can be switched on and off rapidly can be used. The LED devices, for example, produce a stable light that has a very fast on and off switching time and provides the colors that are required.

The optical system 20 contains two target wheels 40 and 41. Within each target wheel are target holders 42 that can contain focus targets in a position 72 more distant from the MUT 30 and in a position 73 that is closer to the MUT. Each target wheel 40 and 41 contains six target holders 42. The target holders 42 within a target wheel 40 and 41 are rotated into position over the optical axis 46 by stepper motors 75 and 76 controlled by the tester 22. Since there are six target holders in each target wheel, the stepper motors 75 and 76 rotate the target wheels in sixty-degree increments. Target wheels with a fewer or a greater number of target holders than six and a corresponding stepper increment are within the scope of the present invention Continuing to refer to FIG. 1, the positioning the target wheels 40 and 41 with respect to each other and the MUT 30 are critical in providing a focus image to the MUT. The positioning of the target wheels 40 and 41 along the optical axis 46 is done with stepper motors 77 and 78 under the control of the tester 22. A field lens 43 is used to focus the image of targets contained within the target holders 42 onto the lens of the MUT 30, and tester 22 controls a stepper motor 79 to position of the field lens 43 along the optical axis 46. A magnifier lens 71 is used in the test of the zoom capability of the MUT 30 and is positioned over the optical centerline 46 with a stepper motor 81 under the control of the tester 22. The magnifier lens 71 is positioned along the optical axis 46 by a stepper motor 80 under the control of the tester 22. The magnifier lens 71 can also be placed above the field lens 43, and the field lens can be exchanged with another field lens so that the optical distance of the targets contained within the target wheels 40 and 41 can be modified with respect to MUT 30 in order to perform the zoom test.

The MUT 30 can have either an electrically controlled zoom or a manually controlled zoom. The zoom capability of the MUT expands or contracts an image incident on the zoom lens to a light sensitive device contained within the MUT. If the zoom is electrically controlled, the tester 22 provides a control signal to adjust the zoom contained within the lens cap 31 of the MUT 30. If the zoom is adjusted manually, the tester 22 controls a zoom stepper 82 in contact with the lens cap 31 to vary the zoom of the MUT 30. The zoom stepper 82 is in addition to and similar to a focus stepper that is needed to focus the lens of the MUT 30

In FIG. 2 is a diagram of the optics system 20 of the present invention in which four focus targets 105, 106, 107 and 108 are positioned in the target holders 42 of the target wheels 40 and 41. Each target holder 42 has a target position 72 that is furthest from the MUT and a target position 73 that is closest to the MUT. The target holders 42 containing the four focus targets 105, 106, 107 and 108 are positioned over the optical centerline 46, and the focus targets 105, 106, 107 and 108 are positioned within the target holders 42 such that an image of all for focus targets can be viewed simultaneously by the MUT. A far focus target 105 is located in the target position 72 of a target holder 42 in the target wheel 40 furthest from the MUT 30. A first intermediate focus target 106, which is closer to the MUT 30 than the far focus target 105, is located in target position 73 of the target holder 42 of target wheel 40. A second intermediate focus target 107, which is closer to the MUT 30 than the first intermediate target 106, is located in target position 72 of a target holder 42 in target wheel 41. A close focus target 108, which is closest to the MUT, is located in target position 73 of the target holder 42 in target wheel 41.

The four focus targets are arranged in the target holders 42 such that all four focus targets 105, 106, 107 and 108 can be viewed by the MUT 30 at the same time. The target holders are round in shape and each focus target occupies approximately one fourth, or ninety degrees, of the target holder. Other shapes of target holder 42 are within the scope of the present invention depending upon the requirements of the optics system 20. The tester 22 sets the distance of the target wheels 40 and 41 from the MUT to values predetermined in a focus test setup by adjusting the stepper motors 77 and 78, and the tester adjusts the field lens to focus a composite image of the focus targets (shown in FIG. 2B) onto the lens of the MUT by controlling the stepper motor 79. A magnifier lens 71 is moved over the optical centerline 46 by a stepper motor 81 under the control of the tester 22. The tester controls a stepper motor 80 to vary the distance of the magnifier lens 71 from the MUT to provide different image sizes to the MUT 30 of the composite image shown in FIG. 2B. The zoom of the MUT 30 is varied under control of the tester 22 for each setting of the magnifier lens 71, and image data from the MUT 30 is coupled to the tester 22 to determine if the composite image maintains focus as the zoom of the MUT is changed. The tester 22 monitors the brightness of the composite image, shown in FIG. 2B, to determine that the focus remains within acceptable focus limits as the zoom is varied.

Figure 2A:
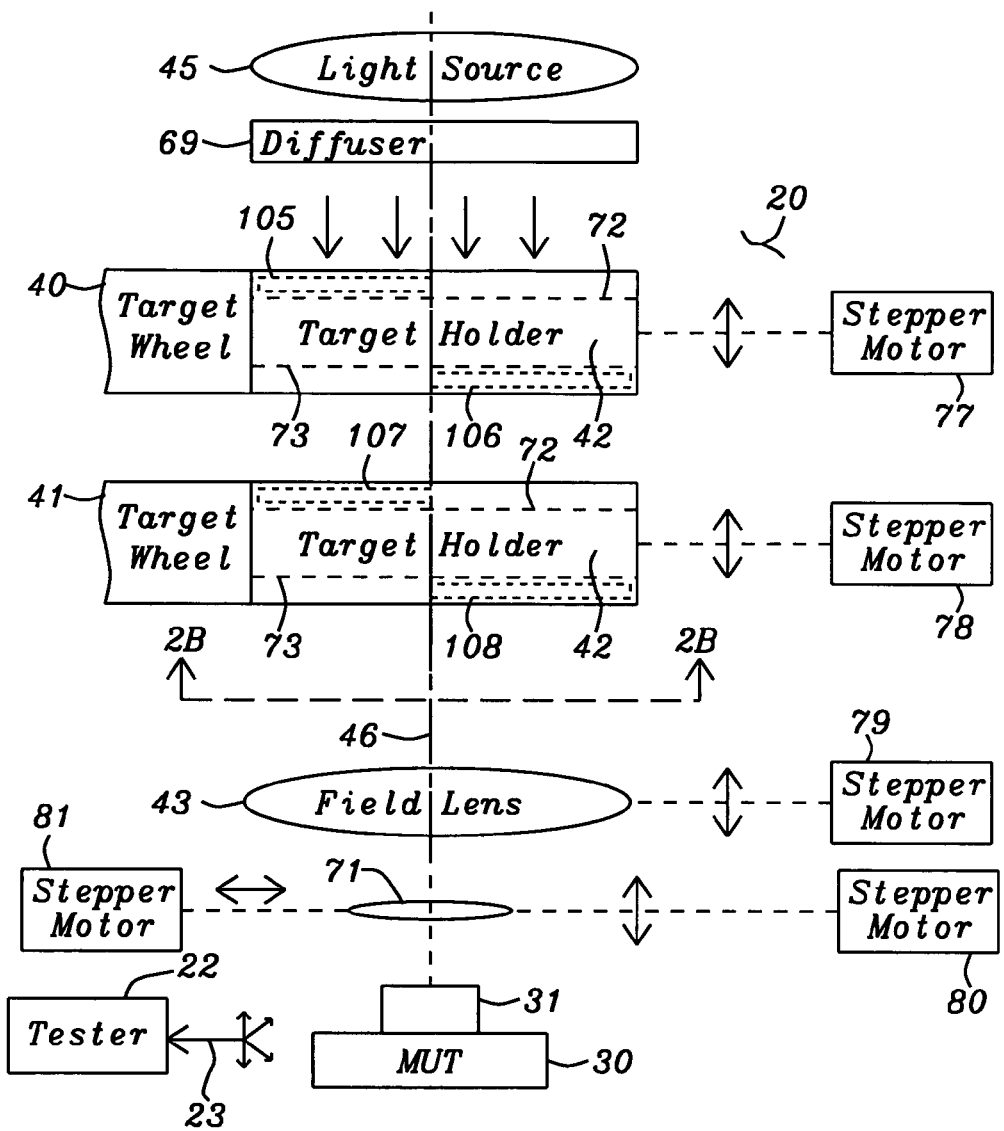
FIG. 2A is a diagram showing a plurality of focus targets mounted in the optical system of the present invention.

Continuing to refer to FIG. 2A, the tester 22 selects different colors of light from the light source 45 and the zoom test is repeated for each color to check the capability of the multiple element lens system of the MUT 30. The MUT can have either an electrical controlled zoom or mechanical zoom. If the MUT 30 has an electrically controlled zoom, the tester 22 provides signals to control the zoom. If the MUT 30 has a manually adjustable zoom, a zoom stepper mechanism 82 (FIG. 1) in contact with the lens cap 31 rotates the lens cap zoom adjustment under the control of the tester 22 to vary the zoom of the MUT 30.

Figure 2B:
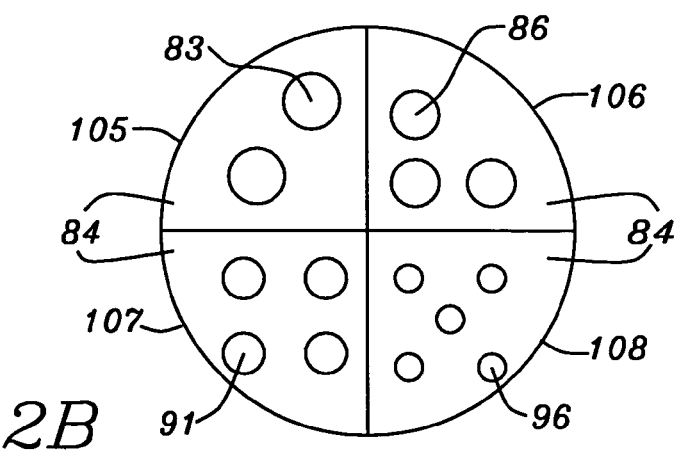
FIG. 2B is a diagram of the image of the plurality of focus targets seen by the MUT.

In FIG. 2B is shown the arrangement of the focus targets 105, 106, 107 and 108 as viewed by the MUT 30. Each of the targets 105, 106, 107 and 108 comprise dark 84 and light areas 83, 86, 91 and 96. The light areas are holes through the material forming the dark areas 84 that allow light to pass through from the light source 45. The holes are preferably round; however, the holes can have other physical shape, i.e. oval, rectangular, hexagonal and octagonal. The arrangement and shape of the holes 83, 86, 91 and 96 are for illustrative purposes only and are not intended to explicitly define the focus targets 105, 106, 107 and 108. In the far focus target 105 the light areas 83 are formed by large holes. In the first intermediate focus target 106 the light areas 86 are formed by holes that are smaller than the light areas 83 in the far target 105. In the second intermediate target 107 the light areas 91 are formed by holes that are smaller than the light areas 86 of the first intermediate focus target 106, and in the close focus target 108 the light areas 96 are formed by holes that are smaller than the light areas 91 in the second intermediate focus target 107.

Figure 3A:
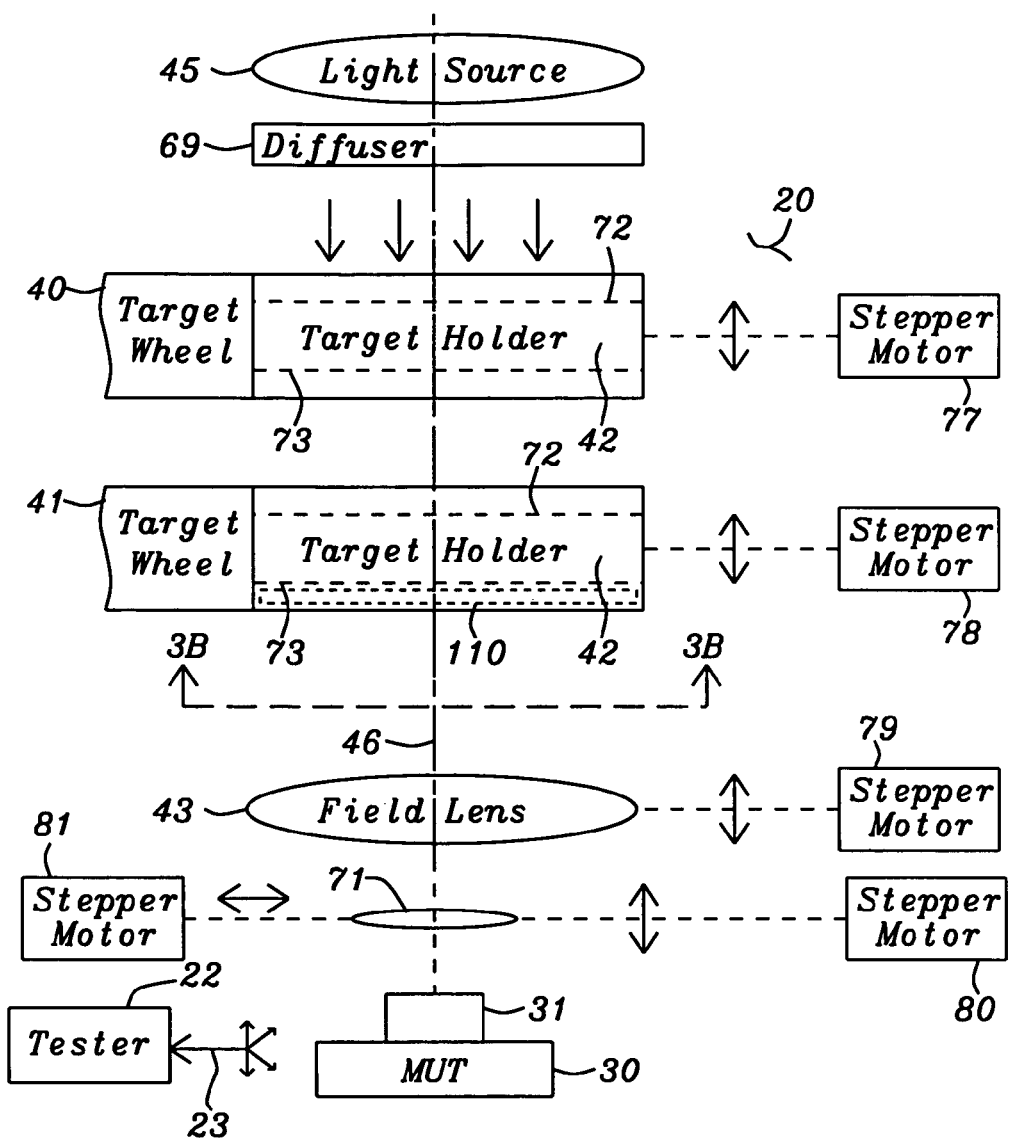
FIG. 3A is a diagram showing a composite focus target mounted in the optical system orthogonal to an optical centerline of the present invention.

In FIG. 3A is shown is a diagram of the optics system 20 of the present invention in which a composite focus target 110 is located in the close target position 73 of a target holder 42 in the target wheel 41. The composite focus target 110 comprises a combination into a single focus target of the far, the first intermediate, the second intermediate and the close focus targets shown in FIGS. 2A and 2B. The location of the composite focus target 110 is for illustrative purposes, and the composite target can be located in either target location 72 or 73 in target holders 42 in either target wheel 40 and 41 depending upon the initial test setup. The determination of the location of the composite target is made during initial focus setup when the settings of the optics system 20 are made. During the initial setup the distance settings of the stepper motors 77, 78 and 79 are made to provide the best focus test of the zoom capability of the MUT 30. The tester 22 stores the initial setup distances setting of the stepper motors to be used in the zoom test of product.

During zoom testing of the MUT 30, the magnifier lens 71 is positioned over the optical centerline 46 by the stepper motor 81 under control of the tester 22. The magnifier lens 71 is moved during zoom test by the stepper motor 80 under control of the tester 22. At a position closest to the lens cap 31 of the MUT 30 the image of the composite target 110 has the smallest magnification, and at a position furthest from the lens cap 31 the image of the composite target 110 is at a largest magnification. At the different distance locations of the magnifier lens 71 from the lens cap 31, the zoom of the MUT 31 is varied under the control of the tester 22, and the tester 22 monitors image data from the MUT. The brightness of the image data is used to determine that the focus of the MUT is maintained during the zoom testing.

Continuing to refer to FIG. 3A, the tester 22 selects different colors of light from the light source 45 and the zoom test is repeated for each color to check the capability of the multiple element lens system of the MUT 30. The MUT can have either an electrical controlled zoom or mechanical zoom. If the MUT 30 has an electrically controlled zoom, the tester 22 provides signals to control the zoom. If the MUT 30 has a manually adjustable zoom, a zoom stepper mechanism 82 (FIG. 1) in contact with the lens cap 31 rotates the lens cap zoom adjustment under the control of the tester 22 to vary the zoom of the MUT 30.

Figure 3B:
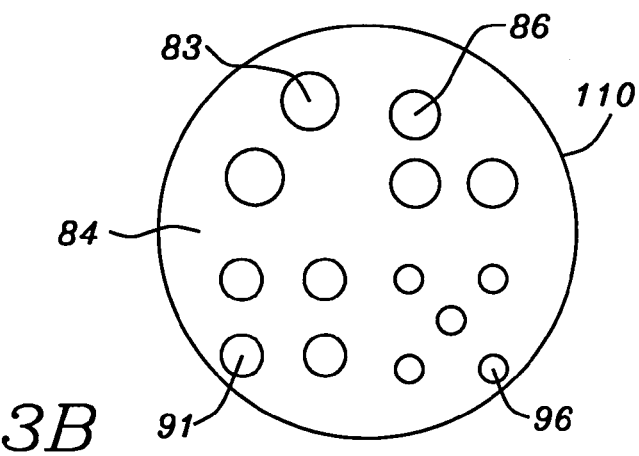
FIG. 3B is a diagram of the image of the orthogonal mounted composite of focus target seen by the MUT.

In FIG. 3B is shown the composite focus target 110 as viewed by the MUT 30. The composite focus target is constructed of light areas 83, 86, 91 and 96 and dark areas 84. The light areas 83, 86, 91 and 96 are holes through the material forming the dark areas 84 that allow light from the light source 45 to pass through to the MUT 30, and the holes can have other physical shape, i.e. oval, rectangular, hexagonal and octagonal. The holes are of different size and represent the different distance targets 105, 106, 107 and 108 shown in FIGS. 2A and 2B. The arrangement and shape of the holes 83, 86, 91 and 91 are for illustrative purposes only and are not intended to explicitly define the composite target. The larger target holes 83 represent the far target 105, the target holes 86 represent the first intermediate target 106, the target holes 91 represent the second intermediate target and the smallest target holes 96 represent the close target, similar to that shown in FIGS. 2A and 2B.

Figure 4A:
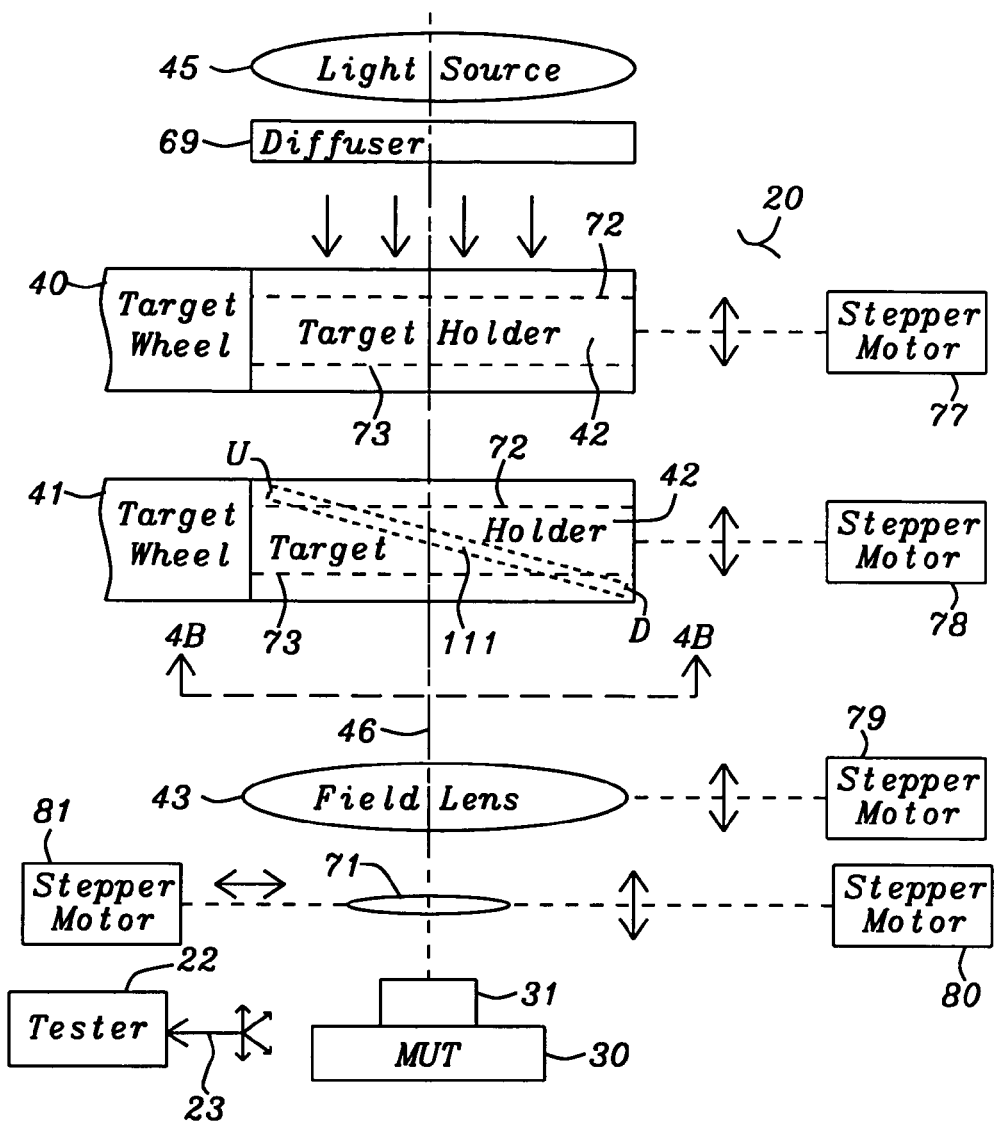
FIG. 4A is a diagram showing the composite focus target mounted at a non-orthogonal angle to the optical centerline of the present invention.

In FIG. 4A is shown the composite focus target 111 positioned in a target holder 42 at a skewed angle to the optical centerline 46 of the optics system 20. The skewed angle provides a depth of field to the view of the MUT 30 during zoom testing where the larger holes 83 are positioned "U" furthest from the MUT and the smallest holes 96 are positioned "D" closest to the MUT. The location of the skewed composite focus target 111 is for illustrative purposes, and the composite target can be located in a target holder 42 in either target wheel 40 and 41. The determination of the location of the composite target is made during initial focus setup when the settings of the optics system 20 are made. During the initial setup the distance settings of the stepper motors 77, 78 and 79 are determined to provide the best focus test of the zoom capability of the MUT 30. The tester 22 stores the initial setup distance settings of the stepper motors to be used in the zoom test of product.

During zoom testing of the MUT 30, the magnifier lens 71 is positioned over the optical centerline 46 by the stepper motor 81 under control of the tester 22, and the magnifier lens 71 is moved during zoom test by the stepper motor 80 under control of the tester 22. The magnifier lens 71 positioned closest to the lens cap 31 of the MUT 30 causes the image of the composite target 111 to have the smallest magnification, and at a position furthest from the lens cap 31 the image of the composite target 111 is at a largest magnification. At the different distance locations of the magnifier lens 71 from the lens cap 31, the zoom of the MUT 31 is varied under the control of the tester 22, and the tester 22 monitors image data from the MUT. The brightness of the image data is used to determine that the focus of the MUT is maintained during the zoom testing.

Continuing to refer to FIG. 4A, the tester 22 selects different colors of light from the light source 45 and the zoom test is repeated for each selected color to check the capability of the multiple element lens system of the MUT 30. The MUT can have either an electrical controlled zoom or mechanical zoom. If the MUT 30 has an electrically controlled zoom, the tester 22 provides signals to control the zoom. If the MUT 30 has a manually adjustable zoom, a zoom stepper mechanism 82 (FIG. 1) in contact with the lens cap 31 rotates the lens cap zoom adjustment under the control of the tester 22 to vary the zoom of the MUT 30.

Figure 4B:
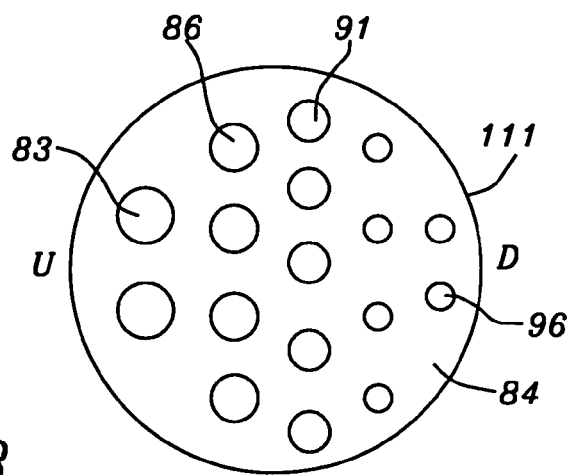
FIG. 4B is a diagram of the image of the non-orthogonal mounted composite of focus target seen by the MUT.

In FIG. 4B is shown the composite focus target 111 as viewed by the MUT 30. The composite focus target is constructed of light areas 83, 86, 91 and 96 and dark areas 84. The light areas are holes through the material forming the dark areas 84 that allow light from the light source 45 to pass through to the MUT 30, and the holes are preferably round but can have other physical shapes, i.e. oval, rectangular, hexagonal and octagonal. The holes are of different size and represent the different distance targets 105, 106, 107 and 108 shown in FIGS. 2A and 2B. The arrangement, shapes and sizes of the holes 83, 86, 91 and 91, in FIG. 4B, are for illustrative purposes only and are not intended to explicitly define the composite target 111. The larger target holes 83 represent the far target 105, the target holes 86 represent the first intermediate target 106, the target holes 91 represent the second intermediate target and the target holes 96 represent the close target shown in FIGS. 2A and 2B. For illustrative purposes, the hole arrangement in target 111 is shown to be different than that of the target 110 (FIG. 3A and 3B) as a result of the skew of the target in the target holder 42 and the requirement for the hole size to be in descending size from the hole 83 furthest from the MUT to the hole 96 closest to the MUT. The letter "U" identifies the edge of the composite focus target that is furthest from the MUT and the letter "D" identifies the edge that is positioned closest to the MUT.

Figure 5:
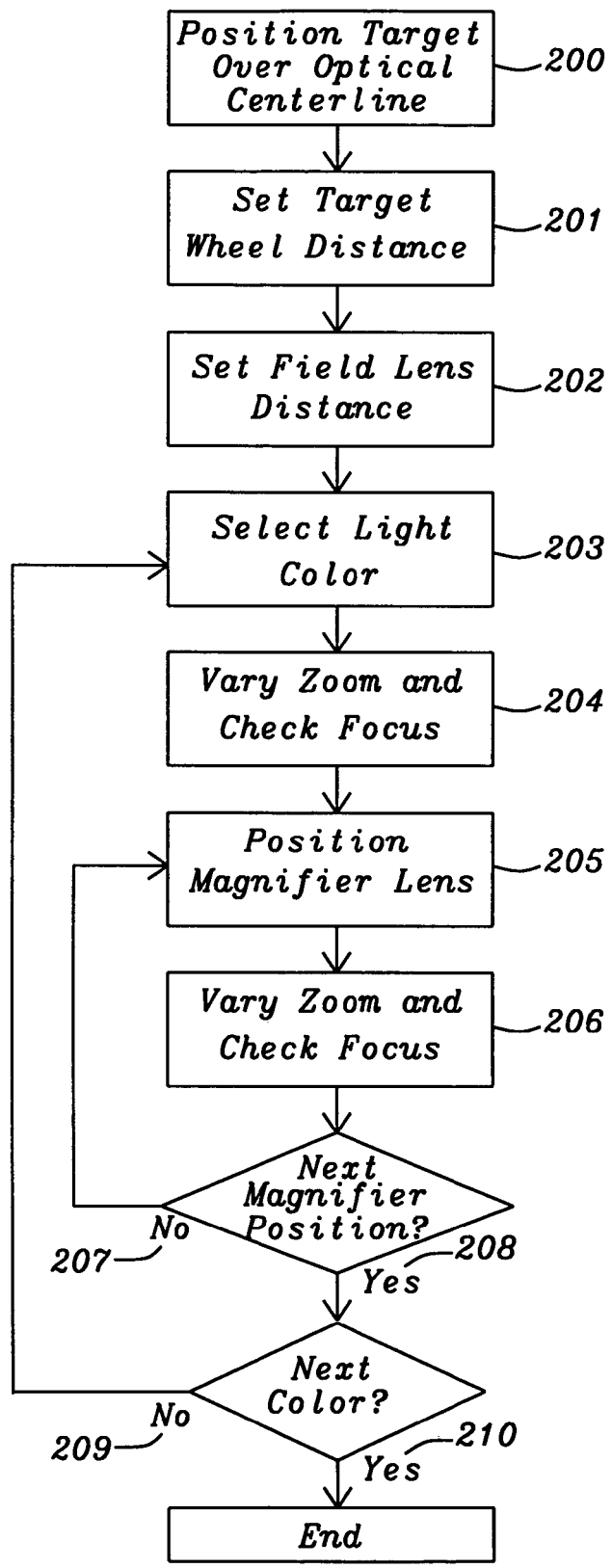
FIG. 5 is a method of testing the zoom capability of a MUT.

In FIG. 5 is a flow diagram of the method of the present invention to test the zoom capability of a miniature digital camera module under test (MUT). Focus targets are placed into target wheels, which are controlled by a tester to position the targets over the optical centerline of an optical system of a test station 200. There can be one focus target with the composite image, shown in FIGS. 3A and 4A, or there may be as many as four targets positioned simultaneously over the optical centerline as shown in FIG. 2A. The distance of the target wheel from the MUT is set 201 by stepper motors controlled by the tester to cause the target wheels to be at distances from the MUT predetermined during an initial setup of the zoom test. The field lens distance from the MUT is set by the tester 202 using a value predetermined in the initial setup of the zoom test. A light color is selected 203 and the zoom of the MUT is varied to check that the focus of the MUT is maintained over the range of the zoom 204. If the zoom of the MUT is electrically adjusted, a signal coupled from the tester to the MUT changes the zoom setting. If the zoom of the MUT is manually adjusted, a zoom stepper mechanism in contact with the lens cap of the MUT is controlled by the tester to turn the lens cap and adjust the zoom of the MUT.

Continuing to refer to FIG. 5, a magnifier lens is inserted between the field lens and the MUT within the optical centerline of the optics system. The magnifier lens is then positioned along the optical centerline 205 and the zoom of the MUT is varied to check that the focus of the target image is maintained over the range of zoom of the MUT 206. If an additional position of the magnifier lens is required 207, the magnifier lens is repositioned 205 and the zoom of the MUT is again varied to check the focus is maintained over the range of the zoom 206. If an additional position of the magnifier lens is not required 208 and a next light color is required 209, a next light color is selected 203 and steps 204 through 208 are repeated. Changing the color of light checks the multiple element zoom lens for focus problems related to a particular color. If the zoom testing has been tested with all of the light colors 210, the zoom testing is ended.

While the invention has been particularly shown and described with reference to preferred embodiments thereof, it will be understood by those skilled in the art that various changes in form and details may be made without departing from the spirit and scope of the invention.

What is claimed is:

1. An optics system for testing a zoom capability of a miniature digital camera module, comprising:
   a) a light source,
   b) a plurality of focus targets,
   c) a field lens,
   d) a magnifier lens,
   e) a digital camera module (MUT) containing a zoom lens, f) at least one of said plurality of focus targets positioned in a target holder in locations ranging from furthest to closest to the MUT to form a composite target, wherein targets in the target holder further comprise a far focus target, a first intermediate focus target, a second intermediate focus target and a close focus target, g) said light source illuminates said focus targets producing an image of said composite target focused onto said MUT by said field lens and said magnifier lens.

2. The optics system of claim 1, wherein said light source produces a red light.

3. The optics system of claim 1, wherein said light source produces a blue light.

4. The optics system of claim 1, wherein said light source produces a green light.

5. The optics system of claim 1, wherein the light source produces an infrared light.

6. An optics system for testing a zoom capability of a miniature digital camera module, comprising:
   a) a light source,
   b) a plurality of focus targets,
   c) a field lens,
   d) a magnifier lens,
   e) a digital camera module (MUT) containing a zoom lens,
   f) said light source illuminates said focus targets producing a target image focused onto said MUT by said field lens and said magnifier lens,
   g) a far focus target located in a target holder furthest from said MUT,
   h) a first intermediate focus target located in said target holder closer to said MUT than said far focus target,
   i) a second intermediate focus target located in said target holder closer to said MUT than said first intermediate focus target,
   j) a close focus target located in said target holder closer to said MUT than said second intermediate focus target.

7. The optics system of claim 6, wherein said far focus target, said first intermediate focus target, said second intermediate focus target and said close focus target are simultaneously positioned between the light source and the MUT to produce a composite image that is focused onto said zoom lens.

8. The optics system of claim 6, wherein said far focus target, said first intermediate focus target, said second intermediate focus target and said close focus target are combined into a single composite focus target, which is positioned between said light source and said MUT to provide a composite image that is focuses onto said zoom lens.

9. The optics system of claim 8, wherein said composite focus target is positioned in said target holder at an angle to an optical centerline between said light source and said MUT.

10. The optics system of claim 9, wherein said far focus target portion of said composite target is positioned furthest from said MUT and said close focus target portion of said composite target is positioned closest to said MUT.

11. The optics system of claim 1, wherein said magnifier lens is moved along an optical centerline between said MUT and said field lens to change a magnification of said target image as viewed by said MUT.

12. The optics system of claim 1, wherein said zoom lens of said MUT is electrically adjustable.

13. The optics system of claim 12, wherein said zoom lens of said MUT expands or contracts said target image onto a light sensitive device within said MUT in response to electrical signals applied to said MUT.

14. The optics system of claim 1, wherein said zoom lens of said MUT is mechanically adjustable.

15. The optics system of claim 14, wherein said zoom lens of said MUT expands or contracts said target image onto a light sensitive device within said MUT in response to a stepper motor driven mechanical device in contact with a lens cap of said MUT.

16. A method of testing a zoom lens of a miniature digital camera module, comprising:
   a) positioning a focus target in a target wheel over an optical centerline of an optics system for testing a digital camera module (MUT) containing a zoom lens,
   b) setting a distance of said target wheel from said MUT,
   c) setting said distance of a field lens that focuses an image of said focus target onto said zoom lens of said MUT,
   d) selecting a color of light to illuminate said focus target,
   e) varying a setting of said zoom lens and checking a focus of said image captured by a light sensitive device within said MUT,
   f) positioning a magnifier lens over said optical center line at a distance from said MUT,
   g) varying said setting of said zoom lens and checking a focus of said image captured by a light sensitive device within said MUT,
   h) reposition said magnifier lens and varying said setting of said zoom lens and checking a focus of said image captured by a light sensitive device within said MUT until all magnifier lens positions have been used,
   i) selecting a next color of light and repeating steps e) through h),
   k) ending when zoom testing with all colors of light has been completed.

17. The method of claim 16, wherein said focus target is a plurality of targets oriented simultaneously in a plurality of target wheels and creating a composite image as viewed by said MUT of said plurality of targets.

18. The method of claim 17, wherein said plurality of focus targets further comprise:
   a) a far target containing large holes to allow said light illuminating the far target to pass through to the MUT,
   b) a first intermediate target containing holes smaller than said far target to allow said light illuminating the first intermediate target to pass through to the MUT,
   c) a second intermediate target containing holes smaller than said first intermediate target to allow said light illuminating the second intermediate target to pass through to the MUT,
   d) a close target containing holes smaller than said second intermediate target to allow said light illuminating the close target to pass through to the MUT.

19. The method of claim 18, wherein said far target is located in said target wheel furthest from the MUT, the first intermediate target is located in said target wheel closer to said MUT than the far target, the second intermediate target is located in said target wheel closer to said MUT than the first intermediate target, and the close target is located in said target wheel closest to said MUT.

20. The method of claim 18, wherein said plurality of focus targets are combined into a single composite target containing a first pattern of said holes representing said far target, a second pattern of holes representing said first intermediate target, a third pattern of holes representing said second intermediate target and a fourth pattern of holes representing said close target.

21. The method of claim 20, wherein said single composite target is mounted in the target wheel orthogonal to the optical centerline.

22. The method of claim 20, wherein said single composite target is mounted in said target wheel at a angle less than ninety degrees to the optical centerline.

23. The method of claim 22, wherein said single composite target is mounted in said target wheel to position said first pattern of holes furthest from said MUT and said fourth pattern of holes closest to said MUT.

24. The method of claim 16, wherein varying said setting of the zoom lens is by an electrical signal from a tester.

25. The method of claim 16, wherein varying said setting of the zoom lens is by a zoom stepper mechanism that physically contacts a lens cap of said MUT to adjust the setting of the zoom.

26. The method of claim 16, wherein checking said focus of the image captured by said light sensitive device is by monitoring a brightness of said image as the zoom is varied.

27. The method of claim 16, wherein positioning said magnifier lens changes the magnification of the image captured by said light sensitive device.

28. The method of claim 16, wherein said zoom lens further comprises multiple elements.

29. The Method of claim 28, wherein selecting said color of light comprises a light of a blue color to check said focus of the zoom lens containing said multiple elements.

30. The Method of claim 16, wherein selecting said color of light comprises a light of a red color to check said focus of the zoom lens containing said multiple elements.

\* \* \* \* \*